(12) United States Patent
Trivedi et al.

(10) Patent No.: US 12,277,039 B1
(45) Date of Patent: Apr. 15, 2025

(54) INTELLIGENT FILE AND FILEGROUP REORGANIZER FOR BACKUP AND RESTORE IN MULTI ENVIRONMENTS

(71) Applicant: Bank of America Corporation, Charlotte, NC (US)

(72) Inventors: Praveen Kumar Trivedi, Gujarat (IN); Anshuman Mohanty, Telangana (IN); Venugopala Rao Randhi, Telangana (IN); Rama Venkata Kavali, Frisco, TX (US)

(73) Assignee: Bank of America Corporation, Charlotte, NC (US)

( * ) Notice: Subject to any disclaimer, the term of this patent is extended or adjusted under 35 U.S.C. 154(b) by 67 days.

(21) Appl. No.: 18/383,923

(22) Filed: Oct. 26, 2023

(51) Int. Cl.
*G06F 11/14* (2006.01)
*G06F 16/22* (2019.01)

(52) U.S. Cl.
CPC ...... *G06F 11/1469* (2013.01); *G06F 11/1448* (2013.01); *G06F 11/1464* (2013.01); *G06F 16/2282* (2019.01); *G06F 2201/80* (2013.01)

(58) Field of Classification Search
CPC .. G06F 11/14; G06F 11/1469; G06F 11/1448; G06F 11/1464; G06F 2201/80
See application file for complete search history.

(56) References Cited

U.S. PATENT DOCUMENTS

| | | | | |
|---|---|---|---|---|
| 7,549,037 B1* | 6/2009 | Kale | ................... | G06F 11/1466 711/219 |
| 8,095,511 B2* | 1/2012 | Zwilling | ............ | G06F 11/2097 707/684 |
| 9,003,282 B2* | 4/2015 | Baer | ..................... | G06F 16/252 715/251 |
| 9,213,706 B2* | 12/2015 | Long | ..................... | G06F 16/332 |
| 11,329,896 B1* | 5/2022 | Narigapalli | ......... | H04L 41/5054 |
| 11,500,731 B2* | 11/2022 | Baker | ................... | G06F 16/215 |
| 2009/0249005 A1* | 10/2009 | Bender | ................ | G06F 16/185 711/E12.001 |
| 2014/0372384 A1* | 12/2014 | Long | ..................... | G06F 16/10 707/679 |
| 2016/0170844 A1* | 6/2016 | Long | .................. | G06F 11/1469 707/679 |
| 2016/0314147 A1* | 10/2016 | Romine | ................ | G06F 16/113 |
| 2021/0064475 A1* | 3/2021 | Baker | ................... | G06F 16/215 |
| 2021/0263810 A1* | 8/2021 | Bharadwaj | .......... | G06F 11/1453 |
| 2021/0365329 A1* | 11/2021 | Bhatnagar | .......... | G06F 11/1448 |

* cited by examiner

*Primary Examiner* — Kamini B Patel
(74) *Attorney, Agent, or Firm* — Weiss & Arons LLP

(57) ABSTRACT

Methods and systems are provided for restoring a source database to a target environment. The methods and systems may include calculating an amount of data on each drive of the source database. The methods and systems may include calculating free space of each drive of the target environment. The methods and systems may include shrinking filegroups in the drives of the source database. The methods and systems may include fetching historical transactional queries run on tables in the filegroups. The methods and systems may include identifying interdependencies between tables using the queries. The methods and systems may include ingesting, by an AI engine, the calculations, the queries, the identified interdependent tables, historical information of table movement and a business use case. The methods and systems may include the AI engine determining how to restore the source database using the ingested information.

20 Claims, 7 Drawing Sheets

INTELLIGENT FILE AND FILEGROUP REORGANIZER FOR BACKUP AND RESTORE IN MULTI ENVIRONMENTS

FIELD OF TECHNOLOGY

Aspects of the disclosure relate to technology for reorganizing and restoring a database.

BACKGROUND OF THE DISCLOSURE

Database applications may use databases. The databases may be utilized for performing work. The databases may become corrupted, damaged, wiped or need to be updated. The databases on the database applications may be backed-up. Database applications may undergo scheduled or corrective restoration to restore or backup the databases stored therein.

Currently, if any drive of the database application's target environment has less space than a corresponding drive of a source database, the restoration will usually get aborted with an error message of insufficient space. The target environment may have insufficient space because the source database grew since the target environment was last backed-up. The source database may grow when other database applications in a network backup additional information to the source database.

The target environment may include a multi-drive structure which has enough space to run the database applications. The multi drive structure may correspond to the multi-drive structure of the source database.

Currently, when the drives of the target environment cannot accommodate their corresponding drives in the source database, the drives are not restored. The drives may not be restored even if the cumulative free space of the drives of the target environment is larger than the cumulative data of the drives of the source database. Furthermore, the drives of the source database are not reshuffled to fit wholly within the drives of the target environment. Still further, the tables, file and filegroups within the drives of the source database are not reorganized to fit within the drives of the target environment.

Therefore, it would be desirable to reshuffle and reorganize the tables, files and/or filegroups within the source database to correspond with the space requirements of each drive in the target environment. It would be further desirable to dynamically determine a method for restoring the drives of the source database for different scenarios.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
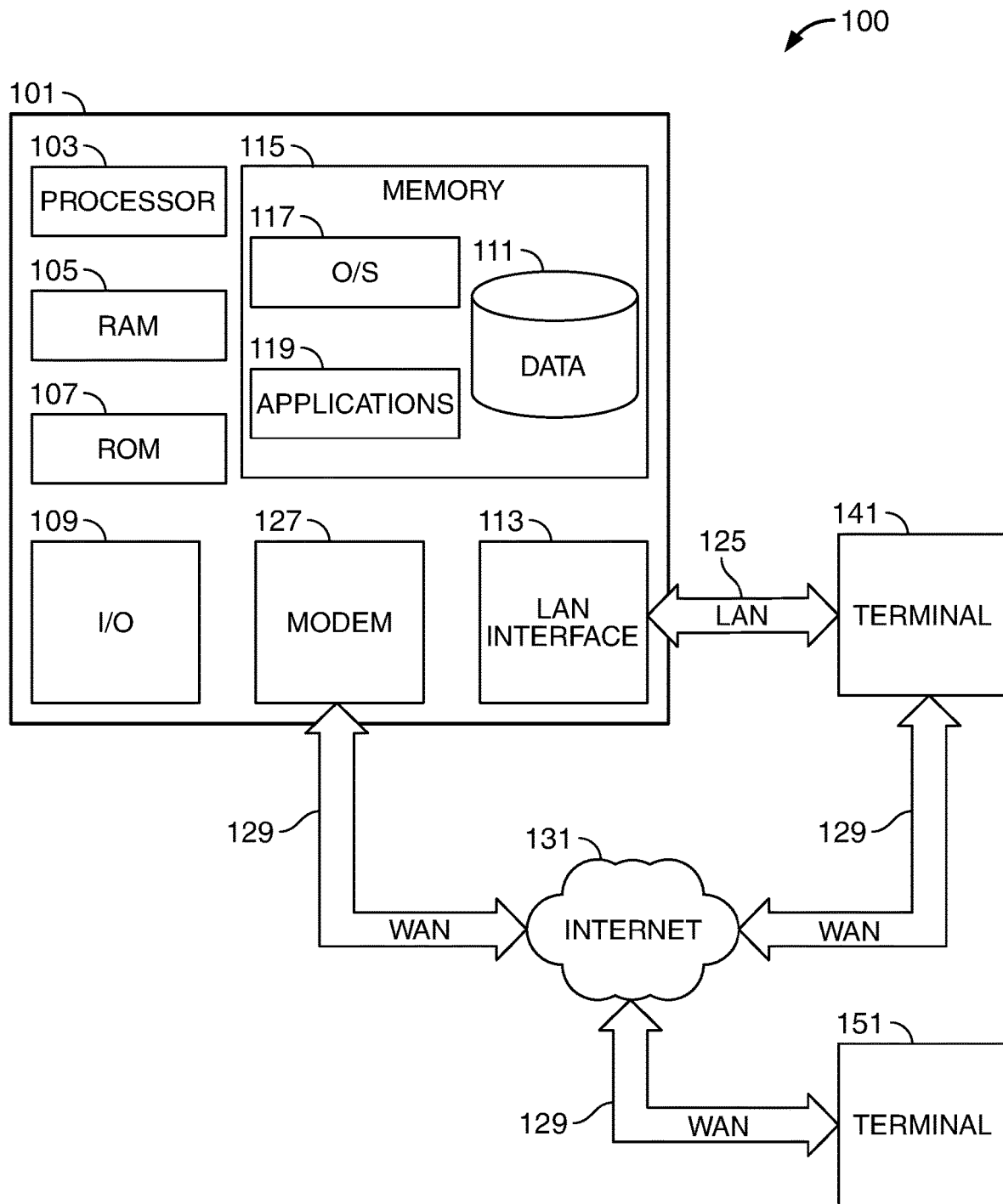
FIG. 1 shows an illustrative apparatus in accordance with principles of the disclosure.

Methods and systems are provided for restoring a database to a target environment. The restoring may include copying data from a source database and saving it to the target environment. The drives of the source database may be restored when drives of the target environment are new, corrupted, outdated, wiped, damaged and/or non-responsive. The corrupted, outdated, wiped, damaged and/or non-responsive drives of the target environment may be wiped completely to prevent duplicate data from being restored. The drives may be wiped to increase free space for the restoration.

Target environments may include applications. The applications may utilize databases. The databases may be utilized for performing work in the target environment. The databases may be stored on drives of the target environment. The drives may be backed up to drives on a source database. The drives may be backed up at regular intervals. The source database may be included on a server, hardware, the cloud, or a combination thereof. The drives of the source database may be restored to the target environment.

The target environment may be part of a network. There may be a plurality of target environments in the network. Each target environment may include different hardware. Each target environment may include a different number of drives. Each target environment may be backed up at different intervals. Each target environment may be for a different business use case. The drives may include a C-drive, a D-drive, an E-drive and/or any other suitable drives.

The plurality of target environments may be restored at regular intervals. The plurality of target environments may be restored after an incident. The plurality of target environments may each require a different method for restoring the drives of the source database. The different methods may be due to each target environment including different hardware, number of drives, backup intervals and/or business use cases.

The methods and systems may include using an artificial intelligence ("AI") engine to dynamically determine the best method for restoring the drives of the source database.

The methods and systems may include selecting a source database. The methods and systems may include selecting a target environment in which to restore the source database. The methods and systems may include calculating an amount of data on each drive of the source database. The methods and systems may include calculating a cumulative amount of data on all the drives of the source database. The methods and systems may include calculating free space on each drive of the target environment. The methods and systems may include calculating a cumulative amount of free space on all the drives of the target environment. The drives of the target environment may have a percentage of space which needs to remain free. The percentage of free space may be reserved for the target environment's core systems.

The drives of the source database may include filegroups and/or files. The filegroups and/or files may include tables.

The AI engine may dynamically determine the method to restore the source database based on the calculations in the discussion above. The calculations may lead to different scenarios. The different scenarios may include different methods for restoring the source database. The scenarios may be described with the following definitions: Number of source drives=n. Size of the filegroups on the source drive=S (Dn). File group size=FG. Number of target drives=m. Size of free space of target drive=$S(T_m)$. Percent of the space to be left unoccupied of file groups on each target drive=P. Any target drive=x. Any source drive=y. Where:

$$S(D_1)=S(F_1G_1)+S(F_1G_2)+\ldots+S(F_1G_n)$$

$$S(D_2)=S(F_2G_1)+S(F_2G_2)+\ldots+S(F_2G_n)$$

$$S(D_n)=S(F_nG_1)+S(F_nG_2)+\ldots+S(F_nG_n)$$

The AI engine may dynamically determine the scenario and proceed with the methods and systems for restoring the source database as described below.

The methods and systems may include a scenario in which the drives of the target environment include a corresponding drive on the source database. Each drive of the target environment may include enough free space to accommodate the data of the corresponding drives of the source database. The source database space distribution for this scenario may be illustratively depicted in table 1.

TABLE 1

Source database drives
Source Database Drives

| Drive | File Group | Size (in GB) |
|---|---|---|
| C | F1G1 | 40 |
| C | F1G2 | 15 |
| D | F2G1 | 10 |
| D | F2G2 | 20 |
| E | F3G1 | 10 |
| | Total | 95 |

The target environment space distribution for this scenario may be illustratively depicted in table 2.

TABLE 2

Target environment drives
Target environment drives

| Drive | Size (in GB) | % Space for non FG | Free Space (in GB) |
|---|---|---|---|
| C | 70 | 10 | 63 |
| D | 40 | 10 | 36 |
| E | 20 | 10 | 18 |
| | | Total | 117 |

In this scenario n=m and $S(D_1) \leq (1-P)*S(T_1) \ldots S(D_n) \leq (1-P)*S(T_n)$.

In this scenario the drives of the source database may be restored to the drives of the target environment directly, without any reshuffling or reorganizing of the drives of the source database.

The methods and systems may include a scenario in which the target environment may have a fewer number of drives than the number of drives of the source database. The drives of the target environment may be able to accommodate the drives of the source database without splitting any of the drives of the source database. The source database space distribution for this scenario may be illustratively depicted in table 1. The target environment space distribution for this scenario may be illustratively depicted in table 3.

TABLE 3

Target environment drives
Target environment drives

| Drive | Size (in GB) | % Space for Non FG | Free Space (in GB) |
|---|---|---|---|
| C | 70 | 10 | 63 |
| D | 70 | 10 | 63 |
| | | Total | 126 |

In this scenario, n≠m and $$S(D_1)+\ldots+S(D_{n-x}) \leq (1-P)*S(T_{m-x}) \ldots$$
$$S(D_{n-y})+\ldots+S(D_n) \leq (1-P)*S(T_m)$$

In this scenario, to accommodate the drives of the source database in the drives of the target environment, the drives of the source database may be reshuffled. The methods and systems may include reshuffling the drives manually. The methods and systems may include reshuffling the drives by an AI engine. The AI engine may utilize algorithms to reshuffle the drives. The reshuffle algorithms may include solving a bin packing problem. The bin packing problem may include determining the most optimized way to place different sized items in different sized bins so that less costly bins are used first. The drives of the source database may be defined as items and the drives of the target environment may be defined as bins. When a size of the drives of the target environment are the same a best fit decreasing algorithm or any other suitable algorithm may be used. When the size of the drives of the target environment are different a multiple knapsack algorithm or any other suitable algorithm may be used.

After the reshuffling, the methods and systems may include restoring the drives of the source database to the drives of the target environment.

The methods and systems may include a scenario in which the drives of the target environment correspond to the drives on the source database. The drives of the target environment may not be able to accommodate their corresponding drives. The source database space distribution for this scenario may be illustratively depicted in table 1. The target environment space distribution for this scenario may be illustratively depicted in table 4.

TABLE 4

Target environment drives
Target environment drives

| Drive | Size (in GB) | % Space for Non FG | Free Space (in GB) |
|---|---|---|---|
| C | 50 | 10 | 45 |
| D | 40 | 10 | 36 |
| E | 20 | 10 | 18 |
| | | Total | 99 |

In this scenario:

$$n=m;$$

$$S(T_1)+\ldots+S(T_m) \geq S(D_1)+\ldots+S(D_n);$$

$$S(D_n)>(1-P)*S(T_m); \text{ and}$$

$$(1-P)*S(T_m)<S(D_1)+\ldots+S(D_{n-x}).$$

In this scenario, the methods and systems may include reducing and reshuffling the drives of the source database to be accommodated in the drives of the target environment. The methods and systems may include reducing the size of the drives on the source database. The reducing may include shrinking filegroups present on the drives.

The shrinking may include performing a shrinking algorithm on the file. The shrinking algorithm may be a standard algorithm. The shrinking may include compressing the tables present within the files of the filegroups. Compressing the tables may include using a standard compression algorithm. The compression algorithm may take repeated terms within the tables and combine and reorganize the repeated terms in a new manner utilizing a dictionary to define the combined terms. Each table may have a different cardinality. The cardinality may be defined as the number of distinct terms within the table. Compressing tables having a small cardinality may leave more free space on the file because there are many terms which may be combined.

Compressing the tables may create free space on the file. However, the free space may not be able to be utilized since it may be dispersed throughout the file. Shrinking may be required to free up the space on the file. Shrinking may reorder the compressed table to have the free space at the end of the table. Having the free space at the end of the table may allow the free space to be utilized.

The methods and systems may include an AI engine determining which files to shrink. The AI engine may fetch historical shrink data. The AI engine may calculate a cardinality of each table. The AI engine may apply a multilinear regression model on the historical shrink data to predict a post shrink size of each table based on the calculated amount of data, the calculated free space, the sorted tables, the calculated cardinalities and the historical shrink data. The AI engine may determine which files to shrink based on the calculated amount of data, the calculated free space and the predicted post shrink size.

The AI engine may select filegroups with the lowest cardinality to shrink. The AI engine may select filegroups within drives of the source database that cannot be accommodated by their corresponding drives in the target environment to shrink. The AI may select filegroups where the post shrink size frees up enough space to accommodate the drive of the source database within the drive of the target environment. The AI may utilize any suitable algorithms for determining which filegroups to shrink.

It may not be beneficial to shrink all the filegroups. Some filegroups may grow in size after shrinking. The dictionaries created after compression may add to the size of the filegroup. Filegroups with high cardinalities may grow in size after shrinking. Shrinking the filegroup may fragment indexes, which can affect performance.

The methods and systems may include when shrinking the filegroups within the drives of the source database enables the drives of the target environment to accommodate their corresponding drives in the source database, the drives of the source database may be restored to their corresponding drives in the target environment.

When shrinking the filegroups within the drives of the source database enables the drives of the target environment to accommodate their corresponding drives in the source database, the methods and systems may include restoring the drives. When shrinking the filegroups within the drives of the source database does not enable the drives of the target environment to accommodate their corresponding drives in the source database the methods and systems may include reorganizing tables within the filegroups. The reorganizing may include moving tables from one filegroup to another filegroup. The AI engine may determine which tables to move.

The methods and system may include the AI engine sorting the tables in the filegroups of the source database in descending size order. After sorting the tables toward the top may be larger. The tables toward the top may be more favorable to move.

The AI engine may fetch historical transactional queries run on the tables. The historical transactional queries may include queries placed in the target environment that pulled data from tables. The historical transactional queries may show whether one table pulls data from a separate table to complete the transaction. The separate table may be dependent upon the one table. The AI engine may identify interdependencies between tables using the historical transactional queries. When moving tables, it may be important to move all the interdependent tables together to enhance performance.

The methods and systems may include the AI engine fetching historical information of table movement from one filegroup to another filegroup. The historical information of table movement may indicate whether any errors came up when moving certain tables. The historical information of table movement may be useful in determining which tables to move.

The methods and systems include the AI engine ingesting the calculated amount of data, the calculated free space, the historical transactional queries, the identified dependent tables and the historical information of table movement. The AI engine may use an algorithm to determine which tables to move. The algorithm may be based on the ingested information. The AI engine may determine multiple tables to move. The AI engine may determine to move the tables and associated interdependent tables. The table and associated interdependent tables may be restricted to those within the same filegroup.

The AI engine may move filegroups. The AI engine may move filegroups from one of the drives of the source database which cannot be accommodated in the corresponding drive of the target environment. The AI engine may move filegroups to one of the drives of the source database which can be accommodated in the corresponding drive of the target environment. The AI engine may move filegroups to one of the drives of the source database which has enough free space to fit the filegroups while still being able to be accommodated in its corresponding drive in the target environment.

The methods and systems may include moving the tables, files or filegroups as determined by the AI engine. After the tables, files or filegroups are moved, the methods and systems may include restoring the drives of the source database to the corresponding drives of the target environment. When after the tables, files or filegroups are moved the drives of the target environment still cannot accommodate the corresponding drives of the source database the drives may not be able to be restored. When the drives are not able to be restored an alert may be generated. The alert may include a reason why the drives are not able to be restored.

It may be desirable to maintain the source database unaltered. The methods and systems may include creating a temporary copy of the source database. The reshuffling may be performed on the temporary copy. The shrinking may be performed on the temporary copy. The moving may be performed on the temporary copy. The restoring may utilize the temporary copy to restore the drives. After the restoration is completed, the temporary copy may be deleted.

The methods and systems may include a scenario in which the number of drives of the source database may be greater than the number of drives of the target environment. The drives of the target environment may have corresponding drives in the source database. The drives of the target environment may not be able to accommodate their corresponding drives and the additional drives of the source database without splitting the additional drives of the source database. The source database space for this scenario may be illustratively depicted in table 1. The target environment space for this scenario may be illustratively depicted in table 5.

TABLE 5

| Target environment drives Target environment drives | | | |
|---|---|---|---|
| Drive | Size (in GB) | % Space for Non FG | Free Space (in GB) |
| C | 55 | 10 | 49.5 |
| D | 60 | 10 | 54 |
| | | Total | 103.5 |

In this scenario:

$n \neq m$;

$(1-F)*S(T_1) + \ldots + S(T_m) > S(D_1) + \ldots + S(D_n)$; and $(1-F)*S(T_x) < S(D_1) + \ldots + S(D_{n-x})$.

This scenario may be similar to the previous scenario. The methods and systems may include shrinking the filegroups. The methods and systems may include the AI engine determining which filegroups to shrink. The shrinking may be similar to the shrinking in the discussion above.

When shrinking the filegroups within the drives of the source database enables the drives of the target environment to accommodate their corresponding drives in the source database and the additional drives of the source database without splitting the additional drives, the methods and systems may include the drives of the source database may be reshuffled. The drives of the source database may be reshuffled according to one of the reshuffling algorithms described in the discussion above. After shrinking and reshuffling the methods and systems may include restoring the drives of the source database to the corresponding drives of the target environment.

When shrinking the filegroups within the drives of the source database does not enable the drives of the target environment to accommodate their corresponding drives in the source database and the additional drives of the source database without splitting the additional drives, the methods and systems may include reorganizing tables within the filegroups. The reorganizing may be similar to the reorganizing in the discussion above.

After the tables, files or filegroups are moved according to the reorganizing, the methods and systems may include restoring the drives of the source database to the corresponding drives of the target environment. When after the tables, files or filegroups are moved the drives of the target environment still cannot accommodate the corresponding drives of the source database the drives may not be able to be restored.

The methods and systems may include a scenario in which the amount of data on the source database exceeds the amount of free space within the target environment. The source database space for this scenario may be illustratively depicted in table 1. The target environment space for this scenario may be illustratively depicted in table 6.

TABLE 6

| Target environment drives Target environment drives | | | |
|---|---|---|---|
| Drive | Size (in GB) | % Space for Non FG | Free Space (in GB) |
| C | 40 | 10 | 36 |
| D | 40 | 10 | 36 |
| E | 20 | 10 | 18 |
| | | Total | 90 |

In this scenario, $n=m$ and $S(D_1) + \ldots + S(D_n) > (1-P)*S(T_1) + \ldots + S(T_m)$.

This scenario may also be possible with $n \neq m$. In this scenario, the methods and systems may include shrinking the filegroups. The methods and systems may include the AI engine determining which filegroups to shrink. The shrinking may be similar to the shrinking in the discussion above.

When shrinking the filegroups within the drives of the source database enables the drives of the target environment to accommodate their corresponding drives in the source database, the methods and systems may include the drives of the source database may be restored to the corresponding drives of the target environment.

When shrinking the filegroups within the drives of the source database does not enable the drives of the target environment to accommodate their corresponding drives in the source database and the additional drives of the source database without splitting the additional drives, the methods and systems may include purging tables, files and/or filegroups from the drives of the source database. The AI engine may determine which tables, files and/or filegroups to purge.

The methods and systems may include the AI engine fetching historical transactional queries run on the tables. The AI engine may use the queries to identify interdependencies between the tables. The AI engine may fetch a business use case for the restoration. The business use case may indicate what databases may be necessary to perform the functions as described by the business use case.

The AI engine may ingest the calculated amount of data, the calculated free space, the historical transactional queries, the identified dependent tables and the business use case. The AI engine may determine based on the ingested information a set of tables, files and/or filegroups to purge from the drives of the source database.

The methods and systems may include purging the set of tables, files and/or filegroups based on the determination made by the AI engine. After the tables, files or filegroups are purged, the methods and systems may include restoring the drives of the source database to the corresponding drives of the target environment. When the drives of the target environment cannot accommodate the corresponding drives of the source database after the tables, files or filegroups are purged, the drives may not be able to be restored.

It may be desirable to maintain the source database unaltered. The methods and systems may include creating a temporary copy of the source database. The shrinking may be performed on the temporary copy. The purging may be performed on the temporary copy. The restoring may utilize the temporary copy to restore the drives. After the restoration is completed, the temporary copy may be deleted.

The purged files may be unrelated to the business use case. The unpurged files may include a minimum viable amount of data for the business use case to be operable. The AI engine may recalculate the free space on the drives of the target environment. The recalculation may be performed at set intervals. The recalculation may be performed when prompted by a user. The set intervals may be every 1, 2, 5, 7, 14 days or any suitable amount of time. The AI engine may store a list of the purged files. The AI engine may restore the purged files to the target environment when the recalculation shows enough free space has become available in the target environment.

One of ordinary skill in the art will appreciate that the steps shown and described herein may be performed in other than the recited order and that one or more steps illustrated may be optional. Apparatus and methods may involve the use of any suitable combination of elements, components, method steps, computer-executable instructions, or computer-readable data structures disclosed herein.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Illustrative embodiments of apparatus and methods in accordance with the principles of the invention will now be described with reference to the accompanying drawings, which form a part hereof. It is to be understood that other embodiments may be utilized, and that structural, functional, and procedural modifications may be made without departing from the scope and spirit of the present invention.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

In accordance with principles of the disclosure, FIG. 1 shows an illustrative block diagram of apparatus 100 that includes a computer 101. Computer 101 may alternatively be referred to herein as a "computer system" or "computing device." Elements of apparatus 100, including computer 101, may be used to implement various aspects of the systems and methods disclosed herein. A "user" of apparatus 100 or computer 101 may include other computer systems or servers or computing devices, such as the program described herein.

Computer 101 may have one or more processors/microprocessors 103 for controlling the operation of the device and its associated components, and may include RAM 105, ROM 107, input/output module 109, and a memory 115. The microprocessors 103 may also execute all software running on the computer 101, e.g., the operating system 117 and applications 119 such as an automatic data layering program and security protocols. Other components commonly used for computers, such as EEPROM or Flash memory or any other suitable components, may also be part of the computer 101.

The memory 115 may include any suitable permanent storage technology—e.g., a hard drive or other non-transitory memory. The ROM 107 and RAM 105 may be included as all or part of memory 115. The memory 115 may store software including the operating system 117 and application(s) 119 (such as an automatic data layering program and security protocols) along with any other data 111 (e.g., historical data, configuration files) needed for the operation of the apparatus 100. Memory 115 may also store applications and data. Alternatively, some or all of computer executable instructions (alternatively referred to as "code") may be embodied in hardware or firmware (not shown). The microprocessor 103 may execute the instructions embodied by the software and code to perform various functions.

The network connections/communication link may include a local area network (LAN) and a wide area network (WAN or the Internet) and may also include other types of networks. When used in a WAN networking environment, the apparatus may include a modem or other means for establishing communications over the WAN or LAN. The modem and/or a LAN interface may connect to a network via an antenna. The antenna may be configured to operate over Bluetooth, Wi-Fi, cellular networks, or other suitable frequencies.

Any memory may include any suitable permanent storage technology—e.g., a hard drive or other non-transitory memory. The memory may store software including an operating system and any application(s) (such as an automatic data layering program and security protocols) along with any data needed for the operation of the apparatus and to allow bot monitoring and IoT device notification. The data may also be stored in cache memory, or any other suitable memory.

An input/output ("I/O") module 109 may include connectivity to a button and a display. The input/output module may also include one or more speakers for providing audio output and a video display device, such as an LED screen and/or touchscreen, for providing textual, audio, audiovisual, and/or graphical output.

In an embodiment of the computer 101, the microprocessor 103 may execute the instructions in all or some of the operating system 117, any applications 119 in the memory 115, any other code necessary to perform the functions in this disclosure, and any other code embodied in hardware or firmware (not shown).

In an embodiment, apparatus 100 may consist of multiple computers 101, along with other devices. A computer 101 may be a mobile computing device such as a smartphone or tablet.

Apparatus 100 may be connected to other systems, computers, servers, devices, and/or the Internet 131 via a local area network (LAN) interface 113.

Apparatus 100 may operate in a networked environment supporting connections to one or more remote computers and servers, such as terminals 141 and 151, including, in general, the Internet and "cloud". References to the "cloud" in this disclosure generally refer to the Internet, which is a worldwide network. "Cloud-based applications" generally refers to applications located on a server remote from a user, wherein some or all the application data, logic, and instructions are located on the internet and are not located on a user's local device. Cloud-based applications may be accessed via any type of internet connection (e.g., cellular or Wi-Fi).

Terminals 141 and 151 may be personal computers, smart mobile devices, smartphones, IoT devices, or servers that include many or all the elements described above relative to apparatus 100. The network connections depicted in FIG. 1 include a local area network (LAN) 125 and a wide area network (WAN) 129 but may also include other networks. Computer 101 may include a network interface controller (not shown), which may include a modem 127 and LAN interface or adapter 113, as well as other components and adapters (not shown). When used in a LAN networking environment, computer 101 is connected to LAN 125 through a LAN interface or adapter 113. When used in a WAN networking environment, computer 101 may include a modem 127 or other means for establishing communications over WAN 129, such as Internet 131. The modem 127 and/or LAN interface 113 may connect to a network via an antenna (not shown). The antenna may be configured to operate over Bluetooth, Wi-Fi, cellular networks, or other suitable frequencies.

It will be appreciated that the network connections shown are illustrative and other means of establishing a communications link between computers may be used. The existence of various well-known protocols such as TCP/IP, Ethernet, FTP, HTTP, and the like is presumed, and the system can be operated in a client-server configuration. The computer may transmit data to any other suitable computer system. The computer may also send computer-readable instructions, together with the data, to any suitable computer system. The computer-readable instructions may be to store the data in cache memory, the hard drive, secondary memory, or any other suitable memory.

Application program(s) 119 (which may be alternatively referred to herein as "plugins," "applications," or "apps") may include computer-executable instructions for an automatic data layering program and security protocols, as well as other programs. In an embodiment, one or more programs, or aspects of a program, may use one or more AI/IL algorithm(s). The various tasks may be related to analyzing and categorizing various data to layer the data according to levels of access.

Computer 101 may also include various other components, such as a battery (not shown), speaker (not shown), a network interface controller (not shown), and/or antennas (not shown).

Terminal 151 and/or terminal 141 may be portable devices such as a laptop, cell phone, tablet, smartphone, server, or any other suitable device for receiving, storing, transmitting and/or displaying relevant information. Terminal 151 and/or terminal 141 may be other devices such as remote computers or servers. The terminals 151 and/or 141 may be computers where a user is interacting with an application.

Any information described above in connection with data 111, and any other suitable information, may be stored in memory 115. One or more of applications 119 may include one or more algorithms that may be used to implement features of the disclosure, and/or any other suitable tasks.

In various embodiments, the invention may be operational with numerous other general purpose or special purpose computing system environments or configurations. Examples of well-known computing systems, environments, and/or configurations that may be suitable for use with the invention in certain embodiments include, but are not limited to, personal computers, servers, hand-held or laptop devices, tablets, mobile phones, smartphones, other Computers, and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, IoT devices, and the like.

Aspects of the invention may be described in the general context of computer-executable instructions, such as program modules, executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network, e.g., cloud-based applications. In a distributed computing environment, program modules may be located in both local and remote computer storage media including memory storage devices.

Figure 2:
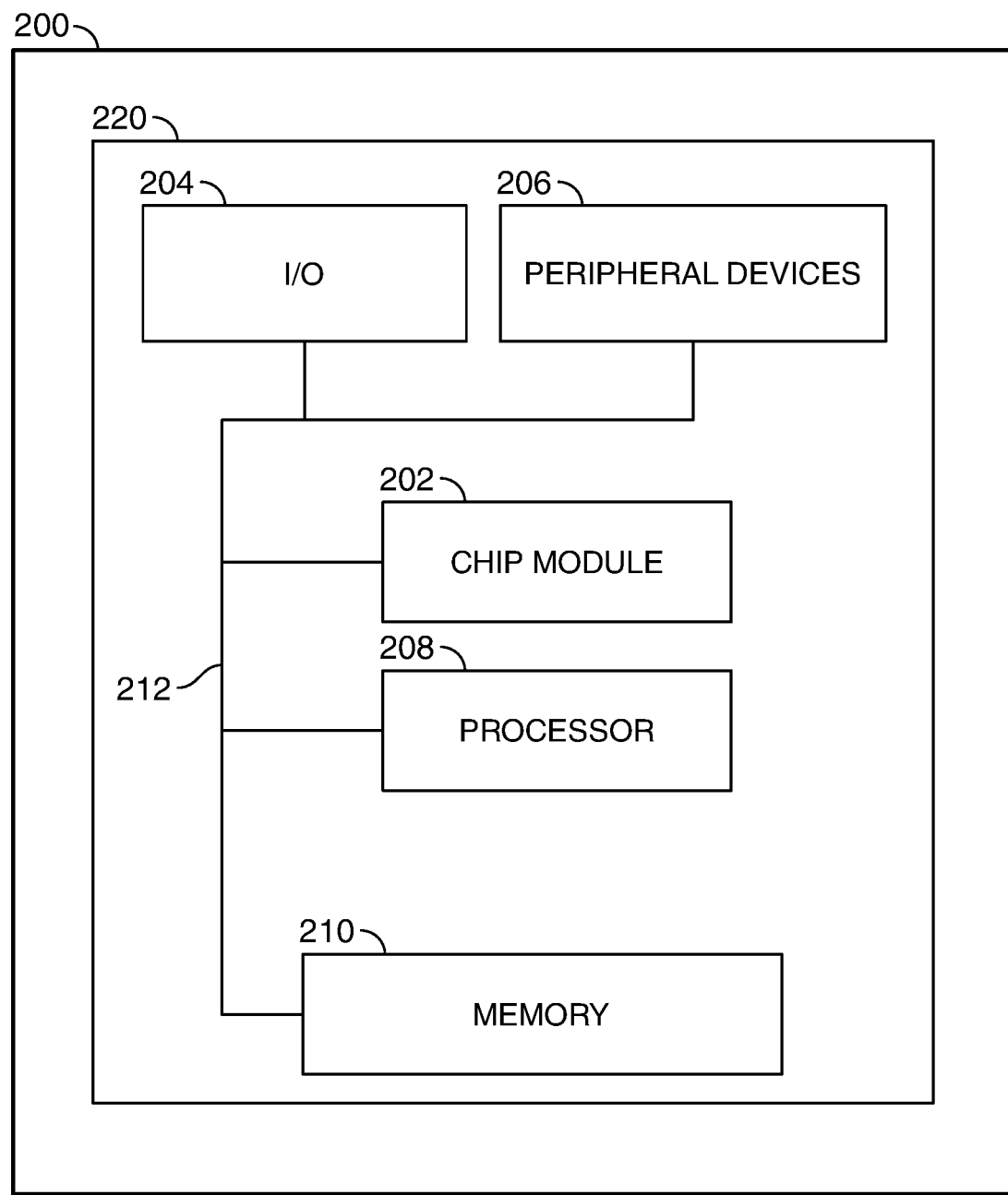
FIG. 2 shows another illustrative apparatus in accordance with principles of the disclosure.

FIG. 2 shows illustrative apparatus 200 that may be configured in accordance with the principles of the disclosure. Apparatus 200 may be a server or computer with various peripheral devices 206. Apparatus 200 may include one or more features of the apparatus shown in FIGS. 1-6. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device, an display (LCD, LED, OLED, etc.), a touchscreen or any other suitable media or devices; peripheral devices 206, which may include other computers; logical processing device 208, which may compute data information and structural parameters of various applications; and machine-readable memory 210.

Machine-readable memory 210 may be configured to store in machine-readable data structures: machine-executable instructions (which may be alternatively referred to herein as "computer instructions" or "computer code"), applications, signals, recorded data, and/or any other suitable information or data structures. The instructions and data may be encrypted.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
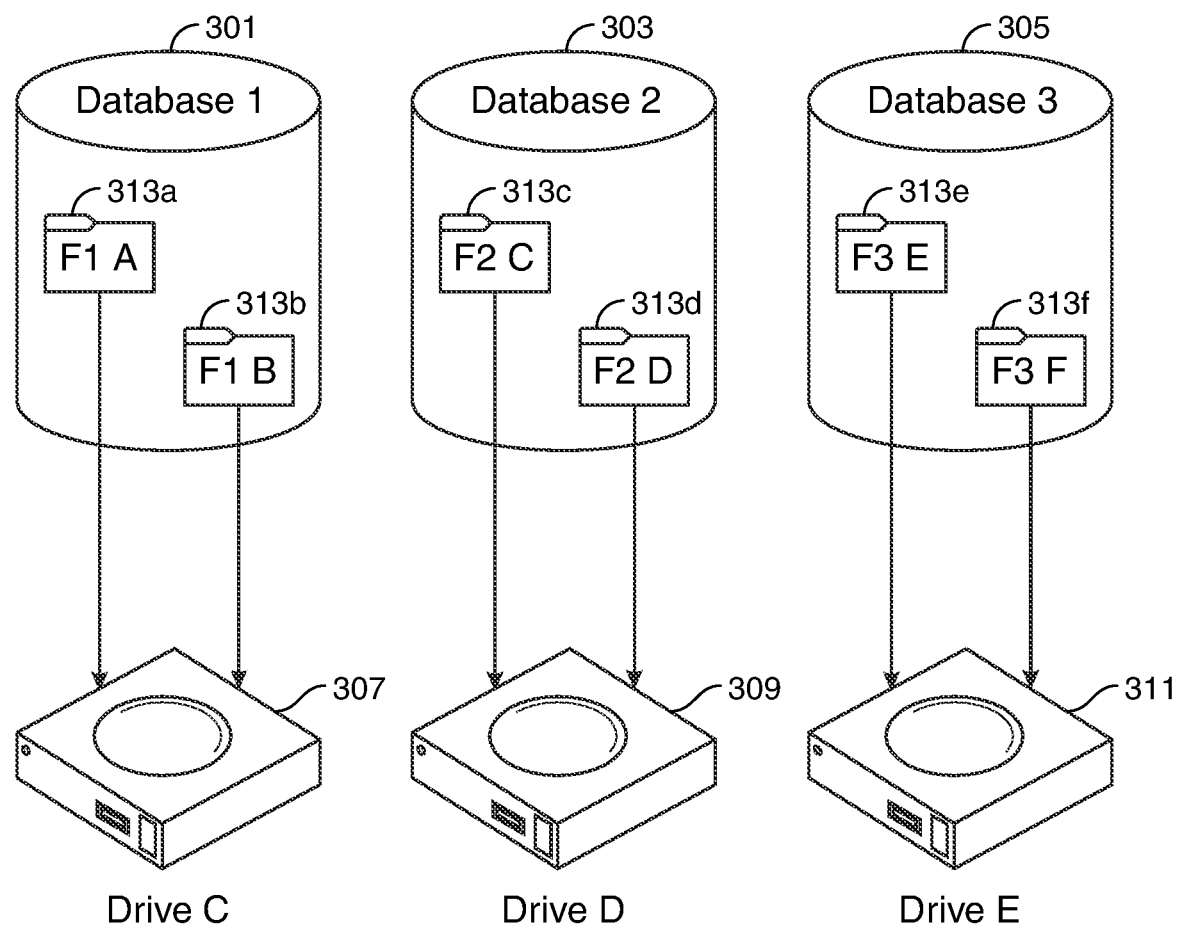
FIG. 3 shows an illustrative diagram in accordance with principles of the disclosure.

FIG. 3 shows an illustrative diagram in accordance with principles of the disclosure. Database 301, database 303 and database 305 may belong to a source database. Database 301 may include filegroup 313$a$ and filegroup 313$b$. Database 303 may include filegroup 313$c$ and filegroup 313$d$. Database 305 may include filegroup 313$e$ and filegroup 313$f$. C-drive 307, D-drive 309 and E-drive 311 may belong to a target environment. Filegroups 313$a$-$f$ may be restored to the drives in the target environment. C-drive 307 may have enough space to receive filegroups 313$a$ and 313$b$. D-drive 309 may have enough space to receive filegroups 313$c$ and 313$d$. E-drive 311 may have enough space to receive filegroups 313$e$ and 313$f$.

Figure 4:
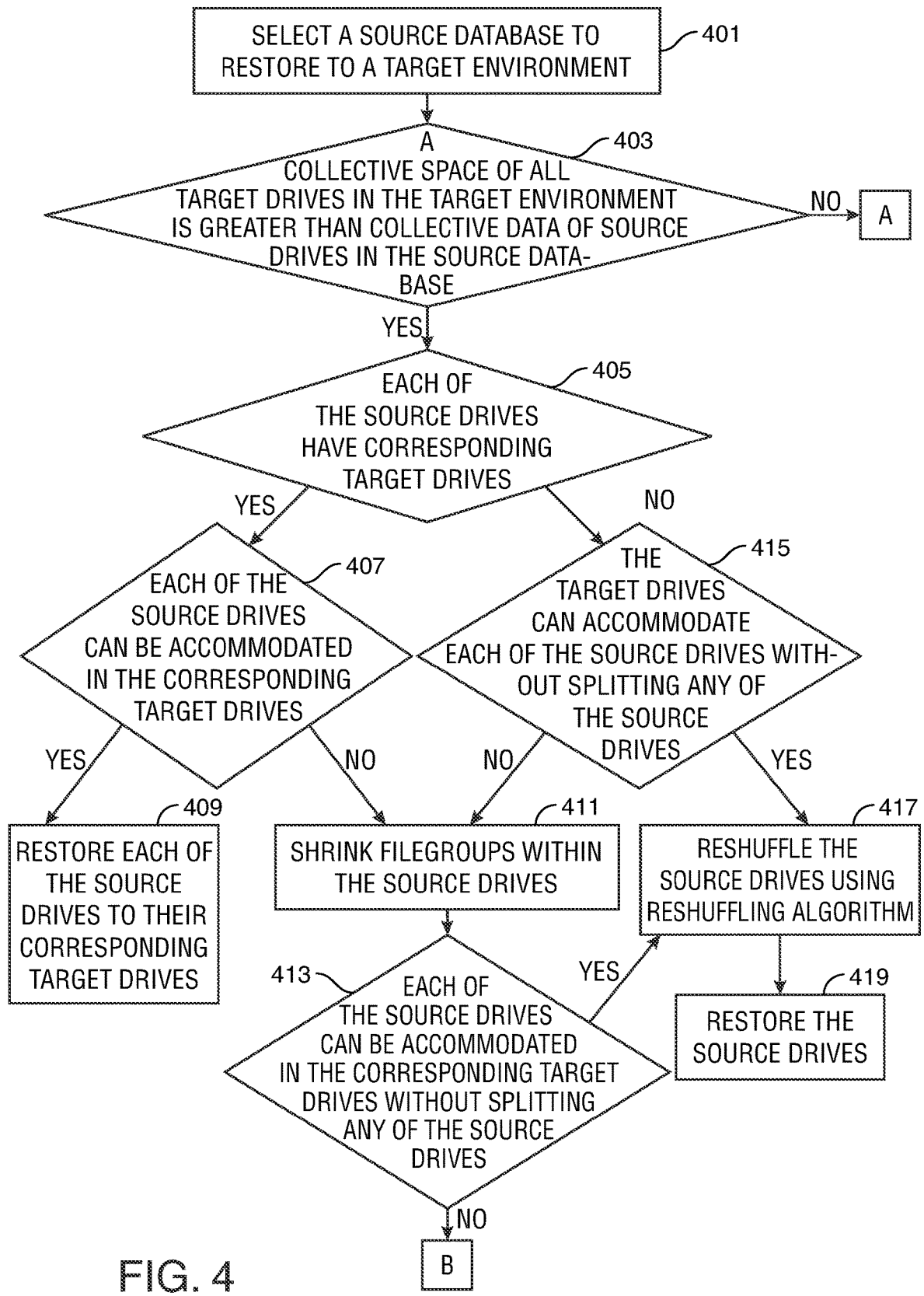
FIG. 4 shows an illustrative flowchart in accordance with principles of the disclosure.

FIG. 4 shows an illustrative flowchart in accordance with principles of the disclosure. The flowchart shows how the methods and systems dynamically determine how to best restore data from a source database to a target environment. At 401 the methods and systems may include selecting the source database to restore to the target environment. At 403 the methods and systems may include determining whether the collective space of each target drive in the target environment is greater than a collective data of the source drives in the source database. When 403 is yes, the flow goes to 405. When 403 is no, the flow goes to A and continues in FIG. 5.

At 405 the methods and systems may include determining whether each drive of the source database has a corresponding drive in the target environment. When 405 is yes, the flow goes to 407. When 405 is no, the flow goes to 415. At 407 the methods and systems may include determining whether the drives of the target environment can accommodate their corresponding drives in the source database. When 407 is yes, the flow goes to 409. When 407 is no, the flow goes to 411. At 409 the methods and systems restore the drives of the source database to their corresponding drives of the target environment.

At 415 the methods and systems may include determining whether the drives of the target environment can accommodate all the drives of the source database without splitting any of the drives of the source database. When 415 is no, the flow goes to 411. When 415 is yes, the flow goes to 417. At 417 the methods and systems may include reshuffling the source drives using a reshuffling algorithm as described above. At 419 the methods and systems restore the drives of the source database to the drives of the target environment according to the reshuffling algorithm.

At 411 the methods and systems may include shrinking filegroups within the source database. At 413 the methods and systems may include determining whether the target drives can accommodate their corresponding drives without splitting any of the source drives. When 413 is yes, the flow goes to 417. When 413 is no, the flow foes to B and continues in FIG. 6.

Figure 5:
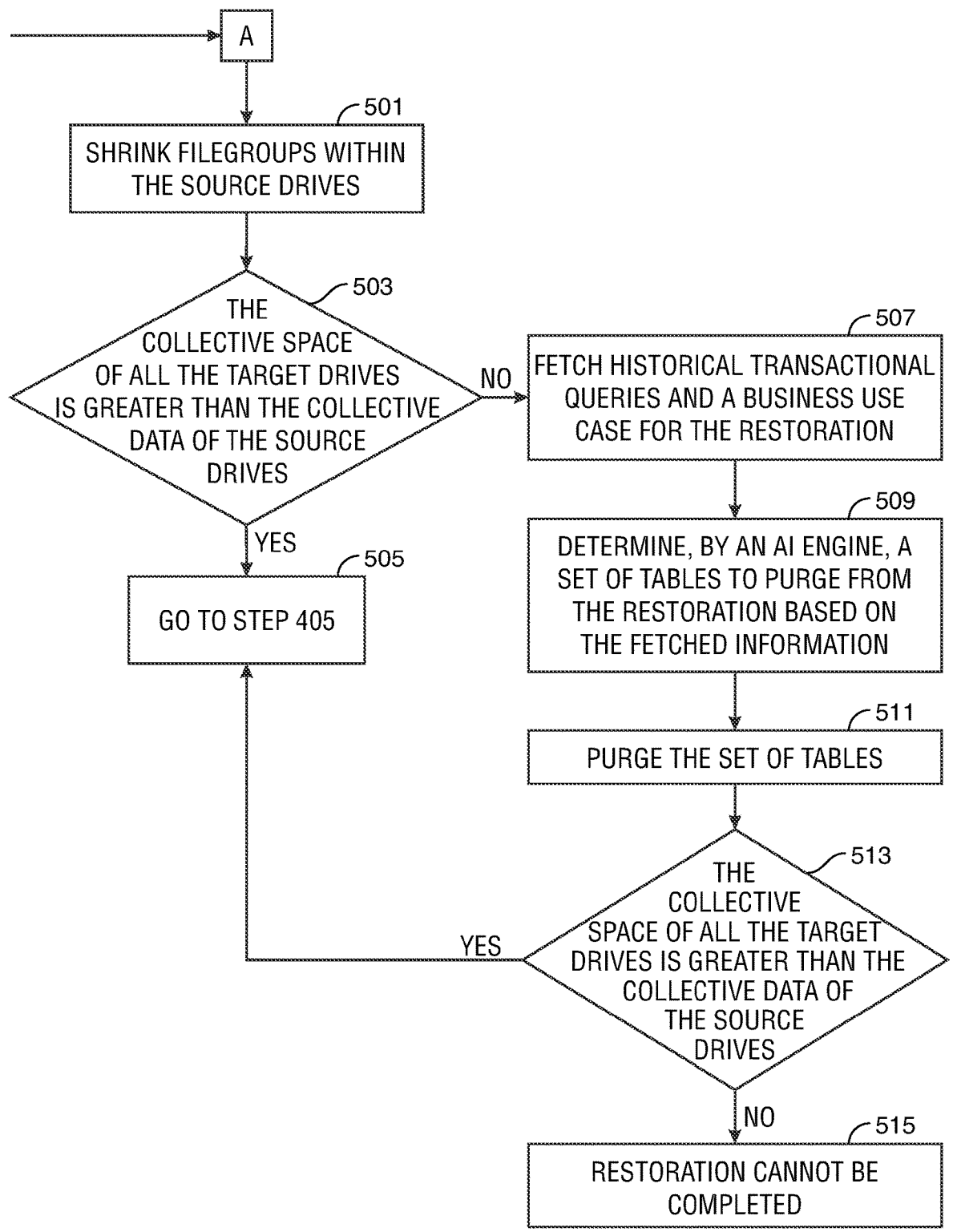
FIG. 5 shows another illustrative flowchart in accordance with principles of the disclosure.

FIG. 5 shows another illustrative flowchart in accordance with principles of the disclosure. The flowchart continues to show how the methods and systems dynamically determine how to best restore data from a source database to a target environment. At 501 the methods and systems may include shrinking the filegroups of the source database. At 503 the methods and system may include determining whether the collective space of each of the drives of the target environment is greater than the collective data of each drive of the source database. When 503 is yes, the flow goes to 505. When 503 is no, the flow goes to 507. At 505 the flow is sent to 405

At 507 the methods and systems may include fetching historical transactional queries and a business use case for the restoration. At 509 the methods and systems may include determining, by an AI engine, a set of tables to purge from the restoration based on the fetched information. At 511 the methods and systems may include purging the determined set of tables. At 513 the methods and systems may include determining whether the collective space of each of the drives of the target environment is greater than the collective data of each of the drives of the source database. When 513 is yes, the flow goes to 505. When 513 is no, the flow goes to 515. At 515 the methods and systems may include cancelling the restoration, since in this flow the restoration cannot be completed.

Figure 6:
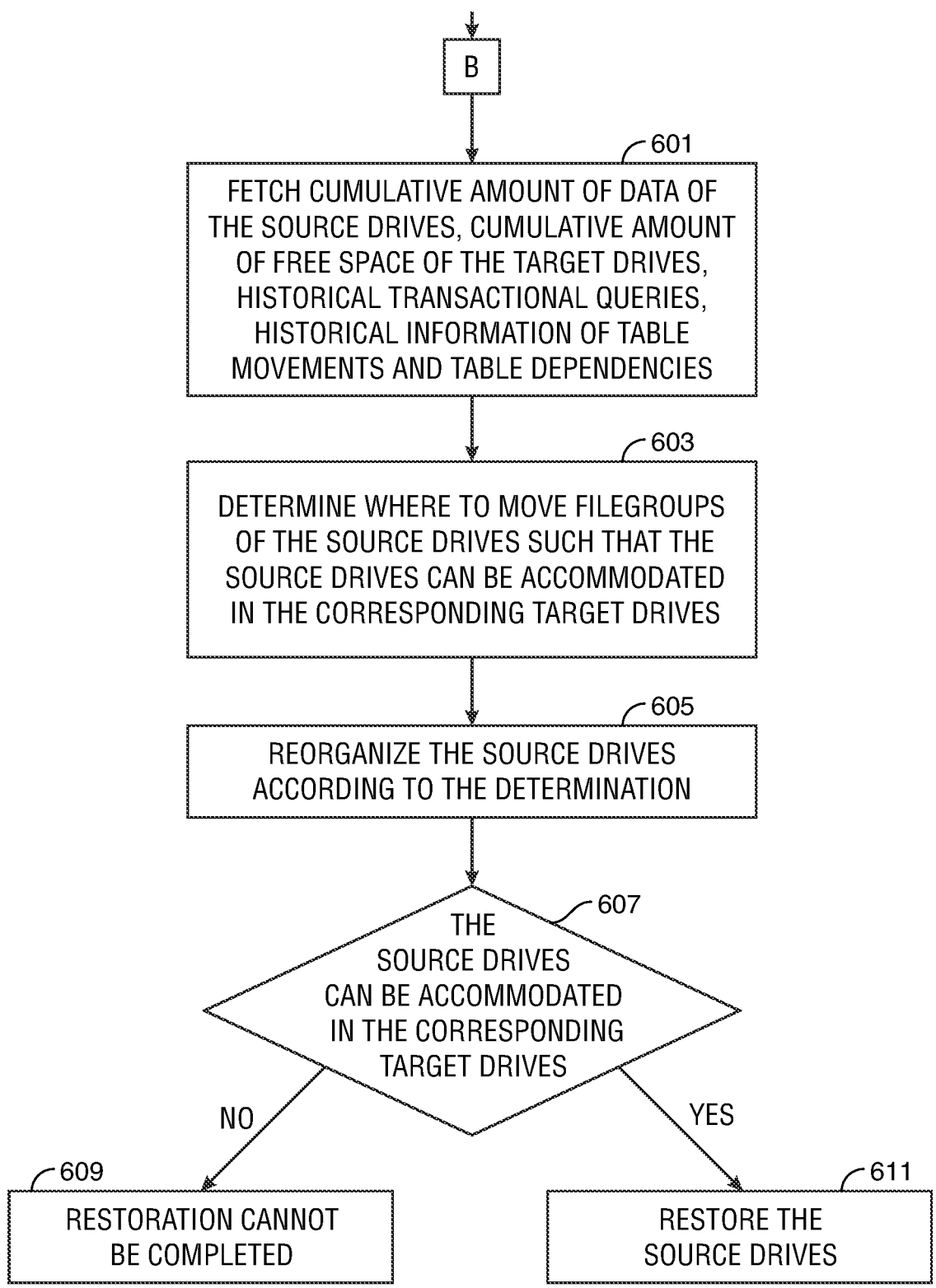
FIG. 6 shows yet another illustrative flowchart in accordance with principles of the disclosure.

FIG. 6 shows yet another illustrative flowchart in accordance with principles of the disclosure. The flowchart continues to show how the methods and systems dynamically determine how to best restore data from a source database to a target environment. At 601 the methods and systems may include fetching a calculation of the cumulative amount of data of the drives of the source database, a calculation of the cumulative amount of free space of all the drives of the target environment, historical transactional queries, historical information of table movement and table interdependencies. At 603 the methods and systems may include determining where to move filegroups of the drives of the source database such that the drives of the target environment can accommodate their corresponding drives of the source database.

At 605 the methods and systems may include reorganizing the drives of the source database according to the determination in 603. At 607 the methods and systems may include determining whether drives of the target environment can accommodate their corresponding drive of the source database. When 607 is no, the flow goes to 609. When 607 is yes, the flow goes to 611. At 609 the methods and systems may include cancelling the restoration, as in this flow the restoration cannot be completed. At 611 the methods and systems restore the drives of the source database to the drives of the target environment.

Figure 7:
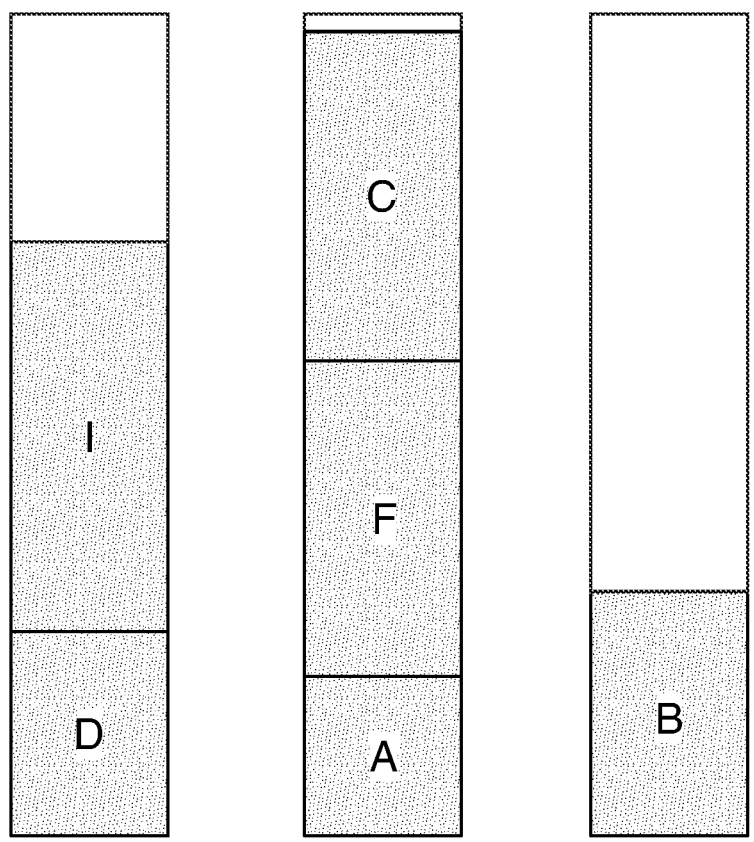
FIG. 7 shows another illustrative diagram in accordance with principles of the disclosure.

FIG. 7 shows a graph of different drives of the source database being shuffled into different drives of the target environment using one of the reshuffling algorithms. For example, the source database may includes drives A, B, C, D, F and I. Each drive may be a different size. Each bin may represent a drive of the target environment. The reshuffling algorithm may optimize the placing of the drives of the source database into the drives of the target environment by determining how best to fit the drives of the source database into the drives of the target environment without splitting up the drives of the source database. In this example drives D and I were placed in the first bin, drives C, F and A where placed in the second bin and drive B was placed in the third bin. This shuffling may leave the maximum amount of space available in the third bin for additional whole drives.

Thus, systems and methods for INTELLIGENT FILE AND FILEGROUP REORGANIZER FOR BACKUP AND RESTORE IN MULTI ENVIRONMENTS have been provided. Persons skilled in the art will appreciate that the present invention can be practiced by other than the described embodiments, which are presented for purposes of illustration rather than of limitation, and that the present invention is limited only by the claims that follow.

What is claimed is:

1. A method for using an artificial intelligence ("AI") engine to restore a source database including a plurality of drives, each drive including a plurality of filegroups, to a target environment including a plurality of drives, the method comprising:
calculating an amount of data on each drive of the source database and a cumulative amount of data on all the drives of the source database;
calculating free space on each drive of the target environment and a cumulative amount of free space on all the drives of the target environment, wherein:
the cumulative amount of free space exceeds the cumulative amount of data; and
each drive of the target environment has a corresponding drive on the source database;
detecting that the source database includes at least one additional drive that does not correspond to any of the drives in the target environment; and
detecting that the drives of the target environment cannot accommodate the data of the corresponding drives of the source database and the data of the at least one additional drive without splitting the data of the at least one additional drive between the drives of the target environment;
sorting tables in the filegroups in descending size order;
shrinking the filegroups;
fetching historical transactional queries run on the tables;

using the historical transactional queries to identify dependencies of one table upon another table within a filegroup;

fetching historical information of table movement from one filegroup of the plurality of filegroups to a different filegroup of the plurality of filegroups;

ingesting, by the AI engine, the calculated amount of data, the calculated free space, the historical transactional queries, the identified dependent tables and the historical information of table movement;

determining, in a first determination by the AI engine, the determination being based on ingested information, into which filegroups of the corresponding drives to move the tables and the dependent tables thereof of the additional drives;

moving the tables and the dependent tables thereof of the additional drives to the corresponding drives according to the first determination; and restoring the drives of the target environment.

2. The method of claim 1, wherein the shrinking further comprises:

fetching historical shrink data;

calculating a cardinality of each table;

ingesting, by the AI engine, the calculated amount of data, the calculated free space, the sorted tables, the calculated cardinalities and the historical shrink data;

applying, by the AI engine, a linear regression model on the historical shrink data to predict a post shrink size of the sorted tables; and determining, in a second determination by the AI engine, which sorted files to shrink based on the calculated amount of data, the calculated free space and the predicted post shrink size.

3. The method of claim 2, further comprising:

compressing the sorted files of the second determination; and shrinking the compressed files.

4. The method of claim 1 wherein the method further comprises:

creating a copy of the source database;

performing the shrinking and the moving on the copy of the source database; and performing, after the shrinking and the moving, the restoring the drives using corresponding drives of the copy of the source database.

5. The method of claim 1 wherein:

the target environment before restoration is either new, corrupted, outdated, wiped, damaged and/or non-responsive.

6. The method of claim 1 wherein the plurality of drives of the target environment includes a C-drive and a D-drive.

7. The method of claim 6 wherein the plurality of drives of the source database includes a C-drive, a D-drive and an E-drive.

8. A method for using an artificial intelligence ("AI") engine to restore a source database including a plurality of drives, each drive including a plurality of filegroups, to a target environment including a plurality of drives, the method comprising:

calculating an amount of data on each drive of the source database and a cumulative amount of data on all the drives of the source database;

calculating free space on each drive of the target environment and a cumulative amount of free space on all the drives of the target environment, wherein:

the cumulative amount of free space exceeds the cumulative amount of data;

a number of drives in the target environment is equal to a number of drives in the source database; and each drive of the target environment has a corresponding drive on the source database; and detecting that at least one of the drives of the target environment cannot accommodate the data of the corresponding drives;

shrinking the filegroups;

sorting tables in the filegroups in descending size order;

fetching historical transactional queries run on the tables;

using the historical transactional queries to identify dependencies of one table upon another table within a filegroup;

fetching historical information of table movement from one filegroup of the plurality of filegroups to a different filegroup of the plurality of filegroups;

ingesting, by the AI engine, the calculated amount of data, the calculated free space, the historical transactional queries, the identified dependent tables and the historical information of table movement;

moving the tables and the dependent tables thereof of the corresponding drives which cannot be accommodated into filegroups of the corresponding drives which can be accommodated, said moving being based on a first determination of the AI engine using ingested information; and restoring the drives of the target environment from their corresponding drives in the source database.

9. The method of claim 8, wherein the shrinking further comprises:

fetching historical shrink data;

calculating a cardinality of each table;

ingesting, by the AI engine, the calculated amount of data, the calculated free space, the sorted tables, the calculated cardinalities and the historical shrink data;

applying, by the AI engine, a linear regression model on the historical shrink data to predict a post shrink size of the sorted tables; and determining, in a second determination by the AI engine, which of the sorted files to shrink based on the calculated amount of data, the calculated free space and the predicted post shrink size.

10. The method of claim 9, further comprising:

compressing the sorted files of the second determination; and shrinking the compressed files.

11. The method of claim 8 wherein the method further comprises:

creating a copy of the source database;

performing the shrinking and the moving on the copy of the source database; and performing, after the shrinking and the moving, the restoring the drives using corresponding drives of the copy of the source database.

12. The method of claim 8 wherein the plurality of drives of the target environment includes a C-drive, a D-drive and an E-drive.

13. The method of claim 12 wherein the plurality of drives of the source database includes a C-drive, a D-drive and an E-drive.

14. A method for using an artificial intelligence ("AI") engine to restore a source database including a plurality of drives, each drive including a plurality of filegroups, to a target environment including a plurality of drives, the method comprising:

calculating an amount of data on each drive of the source database and a cumulative amount of data on all the drives of the source database;

calculating free space on each drive of the target environment and a cumulative amount of free space on all the drives of the target environment;

detecting that the cumulative amount of data exceeds the cumulative amount of free space;

shrinking the filegroups;

sorting tables in the filegroups in descending size order;

fetching historical transactional queries run on the tables;

using the historical transactional queries to identify dependencies of one table upon another table within a filegroup;

fetching a business use case for the restoration;

ingesting, by the AI engine, the calculated amount of data, the calculated free space, the historical transactional queries, the identified dependent tables and the business use case;

determining, in a first determination by the AI engine, a set of tables to purge from the source database, based on ingested information, such that the cumulative amount of free space exceeds the cumulative amount of data;

purging the set of tables according to the first determination; and restoring the drives of the target environment.

15. The method of claim 14, wherein purged tables are unrelated to the business use case.

16. The method of claim 14, wherein unpurged tables include a minimum viable amount of data for the business use case.

17. The method of claim 14, wherein the shrinking further comprises:

fetching historical shrink data;

calculating a cardinality of each table;

ingesting, by the AI engine, the calculated amount of data, the calculated free space, the sorted tables, the calculated cardinalities and the historical shrink data;

applying, by the AI engine, a linear regression model on the historical shrink data to predict a post shrink size of the sorted tables; and determining, in a second determination by the AI engine, which of the sorted files to shrink based on the calculated amount of data, the calculated free space and the predicted post shrink size.

18. The method of claim 17, further comprising:

compressing the sorted files of the second determination; and shrinking the compressed files.

19. The method of claim 14 wherein the method further comprises:

creating a copy of the source database;

performing the shrinking and the purging on the copy of the source database; and performing, after the shrinking and the purging, the restoring the drives using corresponding drives of the source database.

20. The method of claim 19 further comprising:

restoring purged tables to the target environment when free space becomes available in the target environment.

* * * * *